United States Patent
Malipatil et al.

(10) Patent No.: US 8,649,476 B2
(45) Date of Patent: Feb. 11, 2014

(54) ADJUSTING SAMPLING PHASE IN A BAUD-RATE CDR USING TIMING SKEW

(75) Inventors: Amaresh Malipatil, San Jose, CA (US); Wingfaat Liu, Milpitas, CA (US); Ye Liu, San Jose, CA (US); Freeman Y. Zhong, San Ramon, CA (US); Chintan Desai, San Jose, CA (US)

(73) Assignee: LSI Corporation, Milpitas, CA (US)

(*) Notice: Subject to any disclaimer, the term of this patent is extended or adjusted under 35 U.S.C. 154(b) by 420 days.

(21) Appl. No.: 13/081,651

(22) Filed: Apr. 7, 2011

(65) Prior Publication Data
US 2012/0257652 A1    Oct. 11, 2012

(51) Int. Cl.
*H04B 1/38*    (2006.01)

(52) U.S. Cl.
USPC ............ 375/355; 375/219; 375/229; 375/233

(58) Field of Classification Search
USPC .......................... 375/355, 219, 229, 233, 232
See application file for complete search history.

(56) References Cited

U.S. PATENT DOCUMENTS

| | | | | |
|---|---|---|---|---|
| 6,111,920 A | * | 8/2000 | Alelyunas et al. | 375/326 |
| 8,243,866 B2 | * | 8/2012 | Huang et al. | 375/355 |
| 2002/0085656 A1 | * | 7/2002 | Lee et al. | 375/355 |
| 2002/0126784 A1 | * | 9/2002 | Brazeau et al. | 375/371 |
| 2006/0222123 A1 | * | 10/2006 | Mobin et al. | 375/348 |
| 2010/0329322 A1 | * | 12/2010 | Mobin et al. | 375/231 |
| 2010/0329325 A1 | * | 12/2010 | Mobin et al. | 375/232 |
| 2010/0329326 A1 | * | 12/2010 | Aziz et al. | 375/233 |
| 2012/0170621 A1 | * | 7/2012 | Tracy et al. | 375/219 |

* cited by examiner

*Primary Examiner* — Shuwang Liu
*Assistant Examiner* — Helene Tayong

(57) ABSTRACT

In described embodiments, a transceiver includes a baud-rate clock and data recovery (CDR) module with an eye sampler, and an adaptation module for adaptively setting parameters of various circuit elements, such as timing, equalizer and gain elements. Data sampling clock phase of the CDR module is set for sampling at, for example, near the center of a data eye detected by the eye sampler, and the phase of data error sampling latch(es) is skewed by the CDR module with respect to the phase of the data sampling latch. Since the error signal driving the timing adaptation contains the information of the pulse response that the CDR module encounters, the phase of timing error sampling latch(es) of the CDR module is skewed based on maintaining a relative equivalence of input pulse response residual pre-cursor and residual post-cursor with respect to the timing error sampling clock phase.

20 Claims, 12 Drawing Sheets

200

300

400

500

600

700

800

ADJUSTING SAMPLING PHASE IN A BAUD-RATE CDR USING TIMING SKEW

BACKGROUND OF THE INVENTION

1. Field of the Invention

The present invention relates to communication transceiver clock and data recovery (CDR) circuits, and, in particular, to improved margin in a data eye in CDR circuitry.

2. Description of the Related Art

In many data communication applications, Serializer and De-serializer (SerDes) devices facilitate the transmission between two points of parallel data across a serial link. Data at one point is converted from parallel data to serial data and transmitted through a communications channel to the second point where it received and converted from serial data to parallel data.

At high data rates, frequency-dependent signal loss from the communications channel (e.g., the signal path between the two end points of a serial link) as well as signal dispersion and distortion can occur. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal. Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. An automatic adaptation process is often employed to adjust the equalizer's response. Equalization might be through a front end equalizer, a feedback equalizer, or some combination of both.

FIG. 1 shows a data eye diagram 100 overlaid with exemplary data sampler (DS) 102. Data eye diagram 100 illustrates super-positions of many data eyes of signal transitions expressed in amplitude versus time (in unit interval, or "UI", corresponding to a symbol period). The data eye is created as signals transition from low to low, low to high, high to low and high to high, which transition might also be termed a crossing point. A clock and data recovery (CDR) circuit detects timing of the input data stream and uses such detected timing to set correct frequency and phase of a local clock from which the sampling clock for DS 102 is derived. As employed herein, "placing" a sampler (latch) in a data stream requires setting a voltage threshold and clocking phase of the sampler to detect a predetermined point in the data eye. Clocking the data sampler with a clock signal with known frequency and phase derived with respect to the detected symbol timing of data allows for clock recovery of symbols within the data stream generating the eye.

CDR circuits form a critical part of the receiver in a SerDes device. The objective of the CDR circuit is to track the phase of a sampling clock based on some criterion, such as minimized mean-squared-error (MMSE). To track the phase of a sampling clock based on a given criterion, the CDR circuit generates (timing) error samples with respect to the data sampling clock, and adaptively sets the local clock phase used to derive the data sampling clock so as to minimize the timing error with respect to the chosen criterion. The CDR circuit desirably operates so as to achieve very low target bit-error-ratio (BER) (usually, on the order of 1e-12 or 1e-15). The CDR circuits commonly employed might be broadly classified into two categories: baud-rate CDR circuits and bang-bang CDR circuits, with each class having associated advantages and disadvantages.

In bang-bang or Alexander type CDR circuits, the received signal is sampled twice every symbol period, which is the "unit interval" (UI) above. Ideally, one sample is at the crossing boundary and another at the center of the eye. Two consecutive data samples, (d[k−1] and d[k]), and one crossing sample between them, (p[k]), are used to decide whether the current sampling phase is lagging or leading the ideal sampling point and, if either lagging or leading, is corrected accordingly. In a bang-bang CDR circuit, the eye looks symmetric about the sampling point, which is generally desirable for enhanced sinusoidal jitter tolerance. However, oversampling the received signal adds cost and complexity to, for example, a given implementation of a SerDes receiver.

In a baud-rate CDR circuit, the received signal is sampled at the baud rate, i.e., once every UI, so oversampling is not required. The sampling phase might be selected based on different criteria. For example, in a MMSE baud-rate CDR, the sampling phase which yields MMSE is chosen. The phase detector equation implemented in a baud-rate CDR relies on the error samples and the decisions. For example, in a Mueller-Muller CDR, the phase update equation to update phase $\tau_k$ to phase $\tau_{k+1}$ is given in equation (1):

$$\tau_{k+1} = \tau_k - \mu(e_{k-1}d_k - e_k d_{k-1}) \quad (1)$$

where $d_k$ and $e_k$ are the decisions and the error samples, respectively, where $e_k = (y(\tau_k) - \gamma d_k)$, y(t) is the input signal (usually the output of an equalizer) to a slicer (employed to generate a decision for the input sample) and $\gamma$ is the reference voltage, which might also be adapted. The error samples are obtained at the same phase, $\tau_k$, where the data is sampled. Consequently, the error samples are employed as timing error samples by a timing adaptation loop, and the error samples are employed as data error samples by an equalizer adaptation loop if the receiver includes adaptive equalization.

Therefore, if the receiver incorporates a decision feedback equalizer (DFE), the error samples also drive the adaptation of the DFE taps. Returning, to FIG. 1, the data latch DS 102, is shown with positive (top eye edge) and negative (bottom eye edge) error latches 104 and 105 placed above and below at sampling phase instant $\tau_k$. In a Mueller-Muller baud-rate CDR (MM-CDR) circuit, the sampling phase is chosen such that the 1st pre-cursor and the 1st post-cursor values of the equalized pulse about the sampling point are approximately equal. Thus, the sampling point chosen may not be the center of the equalized eye if the equalized pulse is not symmetrical in terms of 1st pre-cursor and 1st post-cursor values.

Ideally, without noise, jitter, and other loss and dispersion effects, the data eye will exhibit a relatively ideal shape with large amplitude and phase margin, illustrated by area 110. In practice, as described previously, the shape of the data eye changes, illustrated by the traces in FIG. 1, providing a reduced area 111. The shape of the data eye changes with noise, jitter, other loss and dispersion effects, and temperature and voltage variations. The shape of the data eye also changes due to equalization applied to input signal of the receiver. In some systems, equalization is also applied by a transmitter's equalizer, further altering the shape of the eye from the ideal. After equalization, the inner eye of the transceiver is open, with some margin for supporting channels. If a simple, analog front-end equalizer (AFE) is employed, the data eye operating margin improves. However, better performance might be achieved through use of a DFE in combination with an AFE. Classical DFE equalization optimizes for ISI and opens up the vertical and horizontal data eye opening.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for generating, by an eye sampler, a data eye from a data stream subject to equalization, the eye sampler including at least one data error sampler, and at least one data sampler; and generating, with a skew CDR circuit, a data clock to each data sampler at a baud rate of the data stream and a data error clock for each data error sampler. The skew CDR positions, in amplitude and phase, the data clock so as to position the data sampler about the center of the data eye, and the data error clock is skewed by a phase offset from the data clock. Phases of the data clock and the data error clock are either fixed or adaptively adjusted based on samples from the data sampler and each data error sampler based on a predetermined criterion.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a transceiver includes a baud-rate clock and data recovery (CDR) module with an eye sampler and an adaptation module for adaptively setting parameters of various circuit elements, such as equalizer and gain elements. Data sampling clock phase of the CDR module is set for sampling at, for example, the center of a data eye detected by the eye sampler, and the phase of timing error sampling latch(es) of the CDR module is skewed with respect to the phase of the data sampling latch. By changing the sampling phase for the timing error latch(es) by a skew $\delta$, ($|\delta|>0$), the pulse response that the CDR module encounters has different cursor, post-cursor and pre-cursor amplitudes compared to the corresponding amplitudes if the sampling phase for timing the error sampling latches is equivalent to the sampling phase for timing the data sampling latch. Since the error signal driving the timing adaptation contains the information of the pulse response that the CDR encounters, the phase of timing error sampling latch(es) of the CDR module is skewed so as to form a relatively symmetric, in phase, data eye about the data sampling phase.

Figure 1:
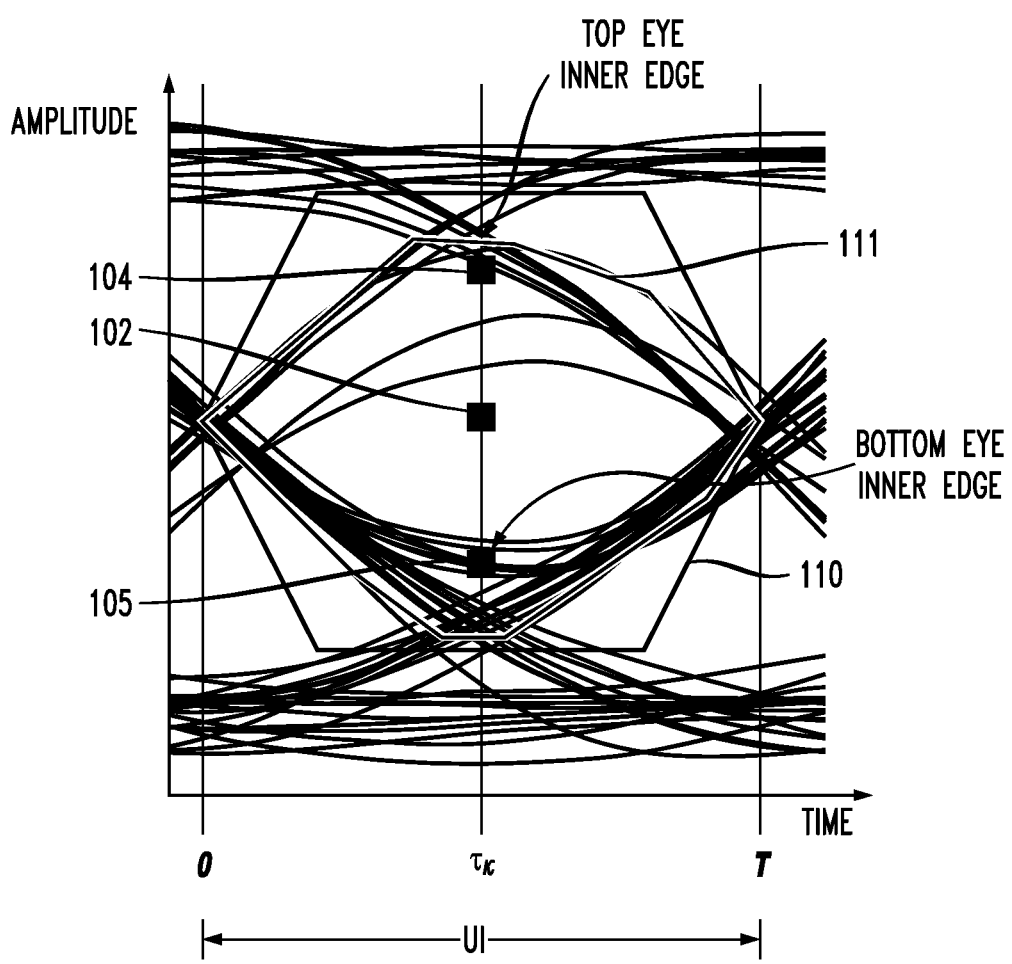
FIG. 1 shows an exemplary data eye diagram of prior art systems.
Figure 2:
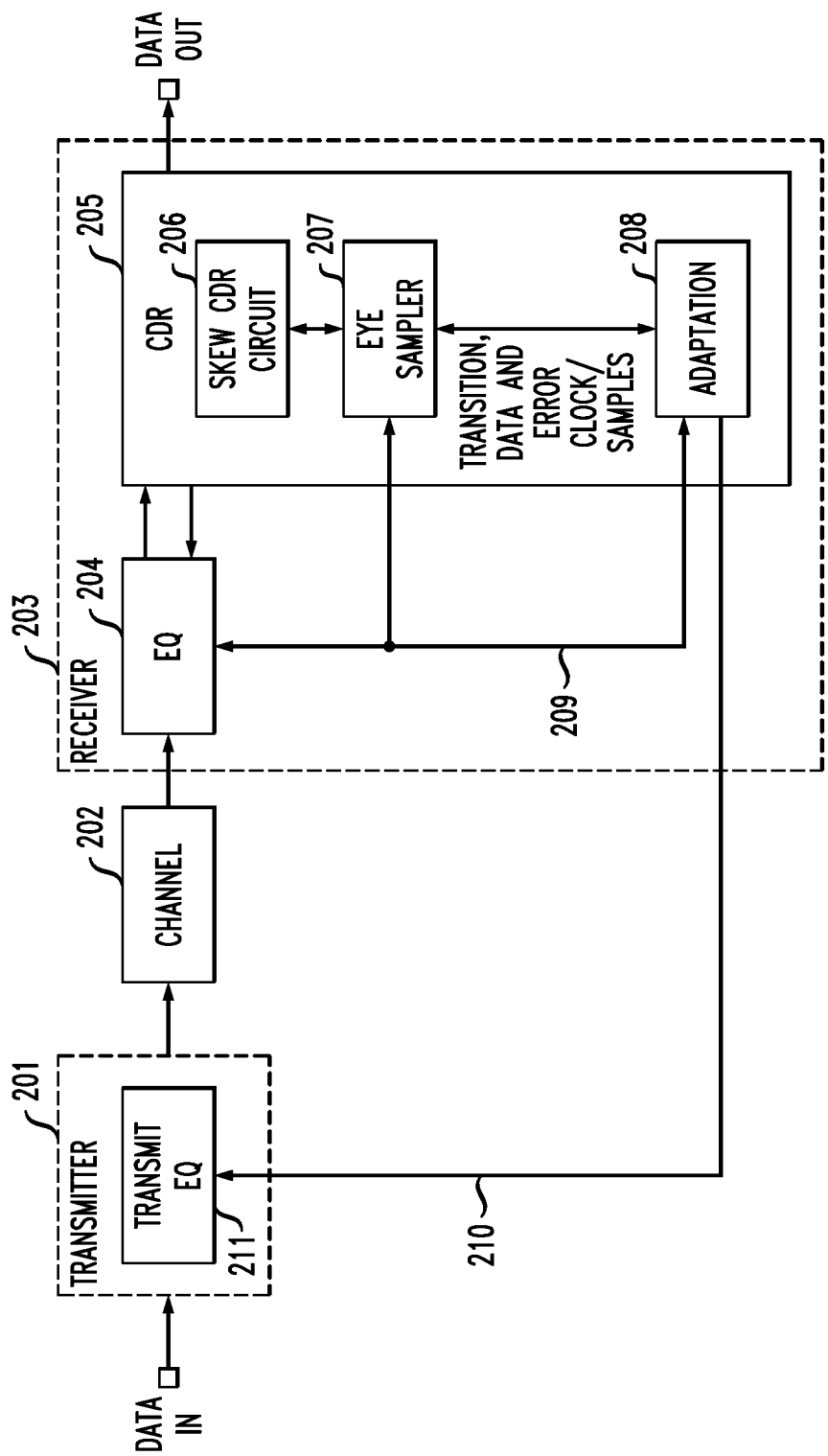
FIG. 2 shows a block diagram of communication system operating in accordance with exemplary embodiments of the present invention.

FIG. 2 shows a block diagram of communication system 200 with a receiver operating in accordance with exemplary embodiments of the present invention. System 200 includes transmitter 201 that transmits a signal through communication channel 202. Channel 202, which might be wired, wireless, optical or some other medium, has an associated transfer function, loss characteristics, and/or other means for adding impairments to the signal passing through it. System 200 further includes receiver 203 having receive equalizer (EQ) 204 to apply equalization to the received signal correct frequency losses, inter symbol interference (ISI) or other impairments applied to the signal by channel 202. EQ 204 might comprise an analog front end (AFE) equalizer followed by a DFE equalizer, but other types of equalization might be employed. EQ 204 might also include filtering and gain elements. Receiver 203 also includes clock and data recovery unit (CDR) 205 implemented as a baud-rate CDR. CDR 205 includes skew CDR circuit 206 real-time data eye sampler 207 and adaptation module 208. EQ 204 is coupled to adaptation module 208 through link 209 to receive the equalized data stream (e.g., either from an AFE equalizer, a DFE equalizer, or both) and exchange information of equalizer and gain parameters to adaptively set gain and equalization of receiver 203. Skew CDR circuit 206 and eye sampler 207, coupled to adaptation module 208, cooperate to generate data and timing information from the received input signal by sampling the input signal at various clock phases and amplitudes corresponding to various positions in the data eye, and then form decisions for data samples provided as output data.

Adaptation module 208 receives transition sample, data sample, data error sample, and timing error sample information (clock signals and corresponding sample values, as discussed subsequently), as well as data decisions and other information employed by adaptation module 208 for the adaptation process from initial lock on the input data signal by CDR 205, to adaptation convergence, to steady state operation. The adaptation process might include timing adaptation to adaptively adjust timing of various clock signals based on various samples and a minimized error criterion. The adaptation process might further include equalization and gain adaptation to adaptively adjust filter parameters of various gain, AFE and DFE elements based on various samples and a minimized error criterion.

Also shown in FIG. 2 is back-channel link 210 that might allow for communication between adaptation module 208 of receiver 203 and transmit equalizer (TX EQ) 211 of transmitter 201. Based on such communication, adaptation module 208 and TX EQ 211 might adaptively set transmit equalizer settings (e.g., tap values), based on the received data stream at receiver 203.

Eye sampler 207 samples the data eye of the equalized received signal with, for example, latches, providing information of eye characteristics based on the output values samplers positioned within the data stream. CDR 205 processes the equalized signal from EQ 204 to recover timing for locally generated clock signals that sample the equalized signal. Such sampling includes: i) generating error samples to recover timing associated with data symbols and to generate information for parameter adaptation (e.g., for equalizer and gain adaptation); and ii) recovering timing for data sampling to generate decisions for data symbols. CDR 205 also employs information of eye characteristics from eye sampler 207 to adjust for various clock timing skew of CDR 205. Adaptation module 208 also receives information of eye characteristics from eye sampler 207 to provide local control signals that set various parameters of gain and equalization of receiver 203, and sends signals to TX EQ 211 for adjusting gain and equalization parameters of transmitter 201.

For described embodiments employing, for example, a Mueller-Muller CDR, the phase update equation to update data sampling phase $\tau_k$ to phase $\tau_{k+1}$ as given in equation (1) above, and repeated below, is:

$$\tau_{k+1} = \tau_k - \mu(e_{k-1}d_k - e_k d_{k-1}) \quad (1)$$

where $d_k$ and $e_k$ are the decisions and the error samples, respectively, where $e_k = (y(\tau_k) - \gamma d_k)$, y(t) is the input signal to a slicer (employed to generate a decision for the input sample) and $\gamma$ is the reference voltage, which might also be adapted.

An error signal generated by CDR 205 driving timing adaptation for data sampling phase $\tau_k$ for the baud-rate CDR contains information of the pulse response that CDR 205 encounters. In accordance with embodiments of the present invention, a modification of commonly employed error latch configurations overcomes drawbacks of a baud-rate CDR circuit. The phase of timing for the error latches is skewed with respect to the phase of timing for the data latch of the baud-rate CDR. The error signal for a phase detector of CDR 205 is obtained at a skew, $\tau_k + \delta$, where $\delta$ is the skew. Skew ($\delta$) might either be positive or negative valued, and the range of skew, for example, might be from −0.5 UI to +0.5 UI. In some implementations, the range might be limited to less than this range, and, as employed herein, such baud-rate CDR configuration with skew applied to the timing error latch is termed a "Skew-CDR." By changing the sampling phase for the timing error latch by a skew ($|\delta|>0$), the pulse response that the CDR encounters has different cursor, post-cursor and pre-cursor amplitudes compared to the corresponding amplitudes if the sampling phase for timing the error latches is equivalent to the sampling phase for timing data latch (e.g., $\delta=0$). A receiver data decision and error sampling block diagram for an embodiment of the Skew-CDR circuit is shown in FIG. 3, and the data eye of a baud-rate CDR having a latch configuration as employed by embodiments of the present invention is shown in FIG. 4.

Figure 3:
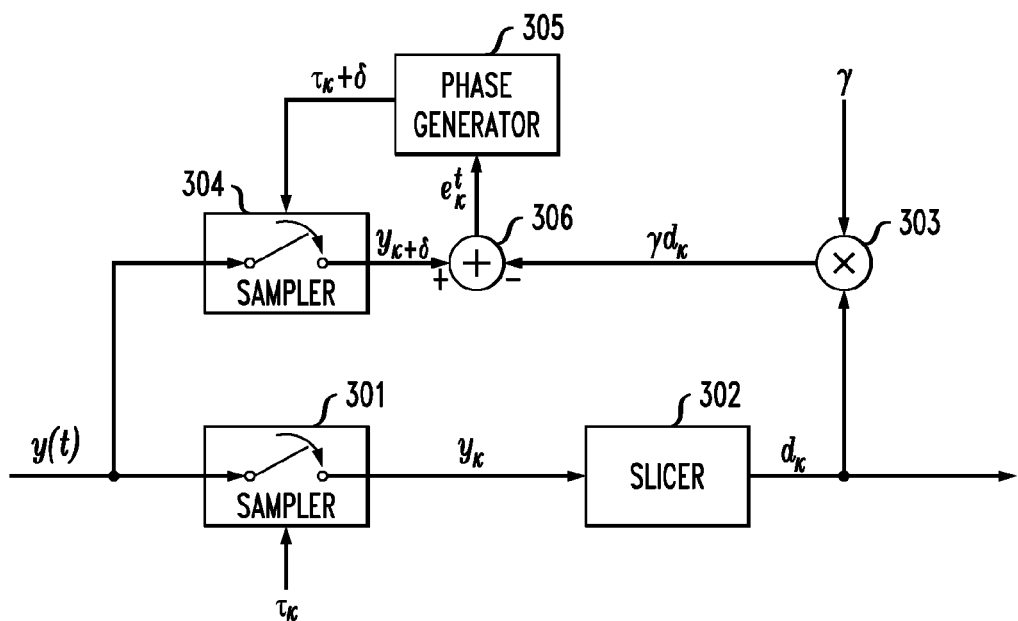
FIG. 3 shows a receiver data decision and error sampling block diagram of a Skew-CDR for an exemplary embodiment of the present invention.

As shown in FIG. 3, Skew-CDR 300 receives input signal y(t) which is sampled with sampler 301 (i.e., the data latch) timed with sampling clock with phase $\tau_k$ to provide sample $y_k$. Input signal y(t) is also sampled with sampler 304 (i.e., the error latch) timed with sampling clock with phase $\tau_k + \delta$, where $\delta$ is the skew, to provide sample $y_{k+\delta}$. Slicer 302 forms decision $d_k$ (in general, either a hard or a soft decision) for each corresponding sample $y_k$. Multiplier 303 then forms $\gamma d_k$ from $d_k$ by multiplying $d_k$ with $\gamma$, where $\gamma$ is the reference voltage. Combiner 306 then forms error signal $e^t_k$ as a difference of sample $y_{k+\delta}$ and $\gamma d_k$. Based on error signal $e^t_k$, phase generator 305 then generates the sampling phase $\tau_k + \delta$ for sampler 304 (i.e., the timing error latch(es)), with skew $\delta$, ($|\delta|>0$), where determination of $\delta$ is described subsequently.

Figure 4:
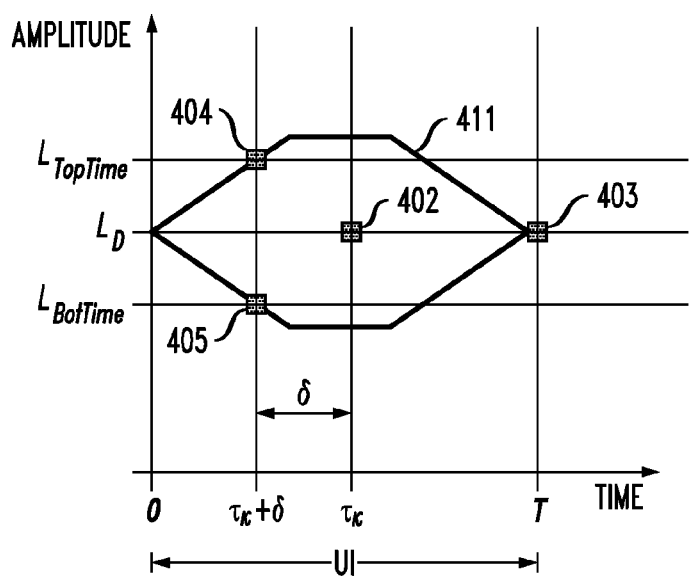
FIG. 4 shows a data eye of the exemplary Skew-CDR of FIG. 3.

FIG. 4 shows an exemplary data eye diagram 400 for data eye 411 generated by Skew-CDR 300 of FIG. 3. Data eye diagram 400 shows placement of data sampler (DS) 402 within data eye 411. DS 402 is sampled with amplitude threshold $L_D$ and with timing $\tau_k$, placing DS 402 at about ½ UI. Top and bottom timing error samplers, TTS 404 and BTS 405, are sampled with amplitude thresholds $L_{TopTime}$ and $L_{BotTime}$, respectively, and with timing $\tau_k + \delta$, placing TTS 404 and BTS 405 at a skewed position from DS 402. Thresholds might also be adaptively set by the adaptation module tracking amplitude and data eye opening.

Figure 5:
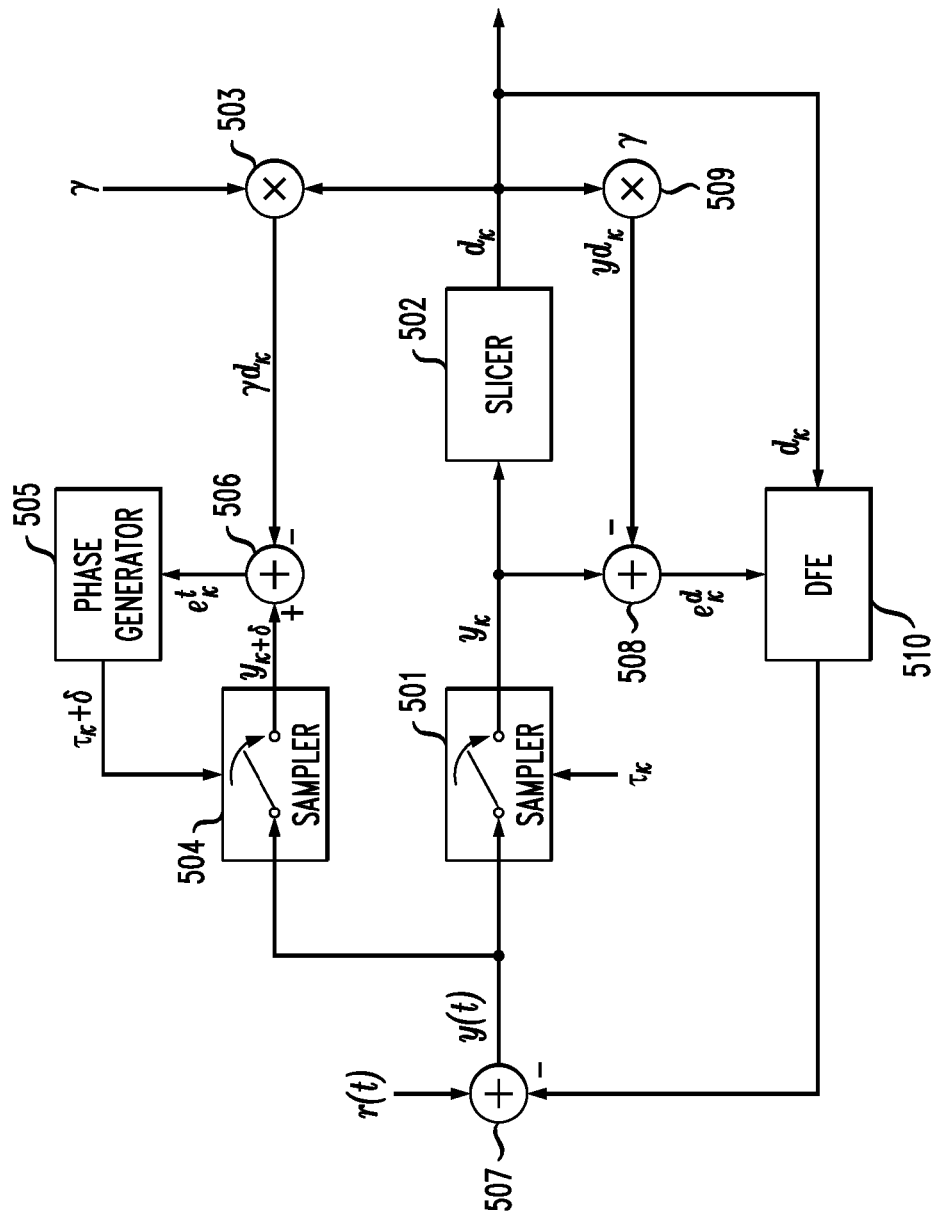
FIG. 5 shows a receiver data decision and error sampling block diagram of a Skew-CDR for an exemplary embodiment of the present invention employing a decision feedback equalizer (DFE)
Figure 6:
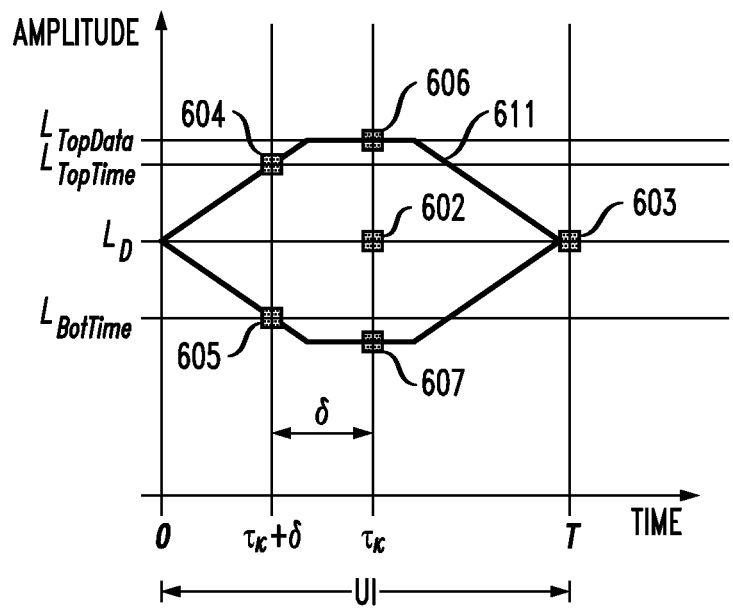
FIG. 6 shows a data eye of the exemplary Skew-CDR of FIG. 5.

If the receiver has a DFE, or any other equalizer or filter, that is adapted using, for example, a minimum error criteria such as sign-sign LMS, error signals are obtained both for timing skew and at the data sampling phase. An exemplary Skew-CDR circuit 500 is as shown in FIG. 5, and corresponding sampler (latch) positions within a data eye are shown in FIG. 6. As shown in FIGS. 5 and 6, adaptation of parameters for various feedback loops that equalize the data eye also use the error at the data sampling phase, $\tau_k$.

Referring to FIG. 5, Skew-CDR 500 receives input signal y(t) which is sampled with sampler 501 (i.e., the data latch) timed with sampling clock with phase $\tau_k$ to provide sample $y_k$. Input signal y(t) is also sampled with sampler 504 (i.e., the timing error latch) timed with sampling clock with phase $\tau_k + \delta$, where $\delta$ is the skew, to provide sample $y_{k+\delta}$. Slicer 502 forms hard decision $d_k$ for each corresponding sample $y_k$. Multiplier 503 then forms $\gamma d_k$ from $d_k$ by multiplying $d_k$ with $\gamma$, where $\gamma$ is the reference voltage. Combiner 506 then forms timing error signal $e^t_k$ as a difference of sample $y_{k+\delta}$ and $\gamma d_k$. Based on timing error signal $e^t_k$, phase generator 505 then generates the sampling phase $\tau_k + \delta$ for sampler 504 (i.e., the timing error latch(es)), with skew $\delta$, ($|\delta|>0$), where determination of $\delta$ is described subsequently.

DFE equalization includes DFE 510. The DFE loop forms input signal y(t) by combining, in combiner 507, a negative estimate of interference derived from the decision sequence $d_k$ with the unequalized or partially equalized input signal r(t) (e.g., the output of an AFE). Combiner 508 then forms data sampling error signal $e^d_k$ as a difference of sample $y_k$ and ($d_k \gamma$) that is generated by multiplier 509. DFE 510 generates adapted filter parameters based on, for example, the data sampling error signal $e^d_k$ at the data sampling phase, $\tau_k$.

FIG. 6 shows an exemplary data eye diagram 600 for data eye 611 generated by Skew-CDR 500 of FIG. 5. Data eye diagram 600 shows placement of data sampler (DS) 602 relatively near the center of data eye 611. DS 602 is sampled with amplitude threshold $L_D$ and with timing $\tau_k$, placing DS 602 at about ½ UI. Top and bottom timing error samplers, TTS 604 and BTS 605, are sampled with amplitude thresholds $L_{TopTime}$ and $L_{BotTime}$, respectively, and with timing $\tau_k+\delta$, placing TTS 604 and BTS 605 at a skewed position from DS 602. Top and bottom data error samplers, TDS 604 and BDS 605, are sampled with amplitude thresholds $L_{TopData}$ and $L_{BotData}$, respectively, and with data sampling timing $\tau_k$, placing TDS 604 and BDS 605 above and below DS 602. TDS 604 and BDS 605, thus, are able to provide a DFE adaptation algorithm an estimate of the positive and negative data sampling error at the data sampling phase, $\tau_k$.

Figure 7:
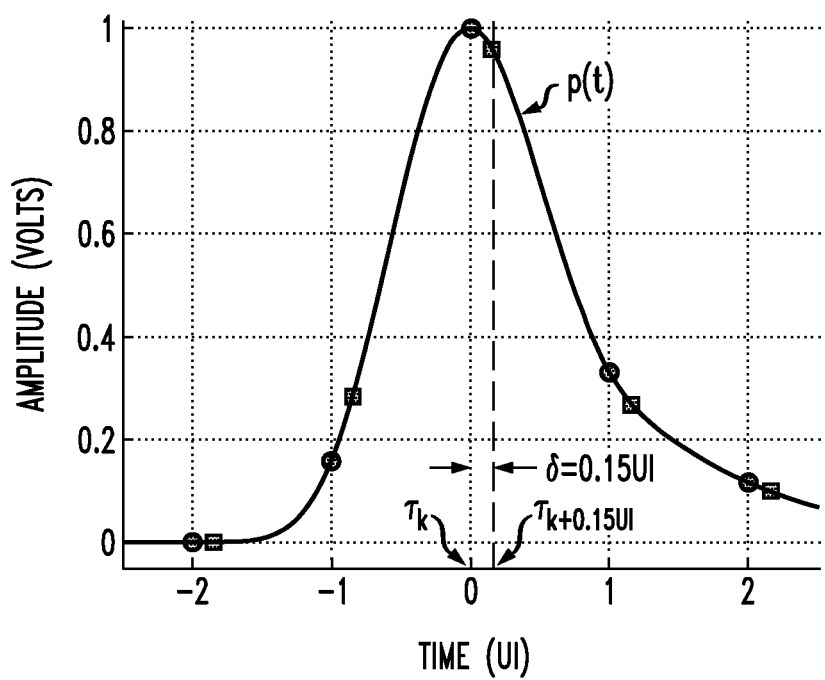
FIG. 7 shows a pulse response of an input symbol pulse as might be observed at a CDR.

Determination of skew $\delta$, ($|\delta|>0$), is now described. FIG. 7 shows a pulse response, p(t), 700 as might be observed at a CDR. Since the timing error signal is obtained before making the decisions with, for example, the slicer, this pulse response is observed at the CDR. The solid circles in FIG. 7 are baud-spaced samples assuming sampling at the peak of the normalized pulse response. The first post-cursor (at +1 UI) is larger than the first precursor (at −1 UI) sampling at the peak. In a Mueller-Muller baud-rate CDR, for example, the sampling phase is selected such that the 1st pre-cursor and the 1st post-cursor of the equalized pulse about the sampling point are equal. In this particular case, the CDR shifts to a sample phase around the solid squares in FIG. 7 (e.g., at about 0.15 UI) to the right side of the peak because, with respect to this sampling phase, the 1st pre-cursor and $1^{st}$ post-cursor are almost equal, resulting in an asymmetric eye. In an asymmetric eye, the left horizontal eye opening (Hl) and the right horizontal eye opening are different (Hr). Therefore, the sinusoidal jitter tolerance (SJT) is reduced, where SJT is the maximum amplitude of sinusoidal jitter about the sampling point that can be tolerated without errors (e.g., for some systems, approximately 2*min(Hl, Hr)).

If the Skew ($\delta$) of the timing error latch is set to be approximately +0.15 UI with respect to the data sampling phase, then when the sampling phase of the timing error latch reaches +0.15 UI the Skew-CDR achieves convergence. However, the actual data is sampled at 0 UI (which is the peak of the pulse), giving a relatively symmetrical data eye. By varying the Skew ($\delta$), the shape of the eye with respect to the data sampling phase might be adjusted. With a MM-CDR, the left eye margin is smaller than the right eye margin if residual 1st post-cursor is smaller than residual 1st pre-cursor. Thus, to achieve a relatively symmetrical eye, Skew ($\delta$) is negative-valued (i.e., $\delta<0$). Similarly, if residual $1^{st}$ post-cursor is larger than residual 1st pre-cursor, Skew ($\delta$) is positive-valued (i.e., $\delta>0$).

Figure 8:
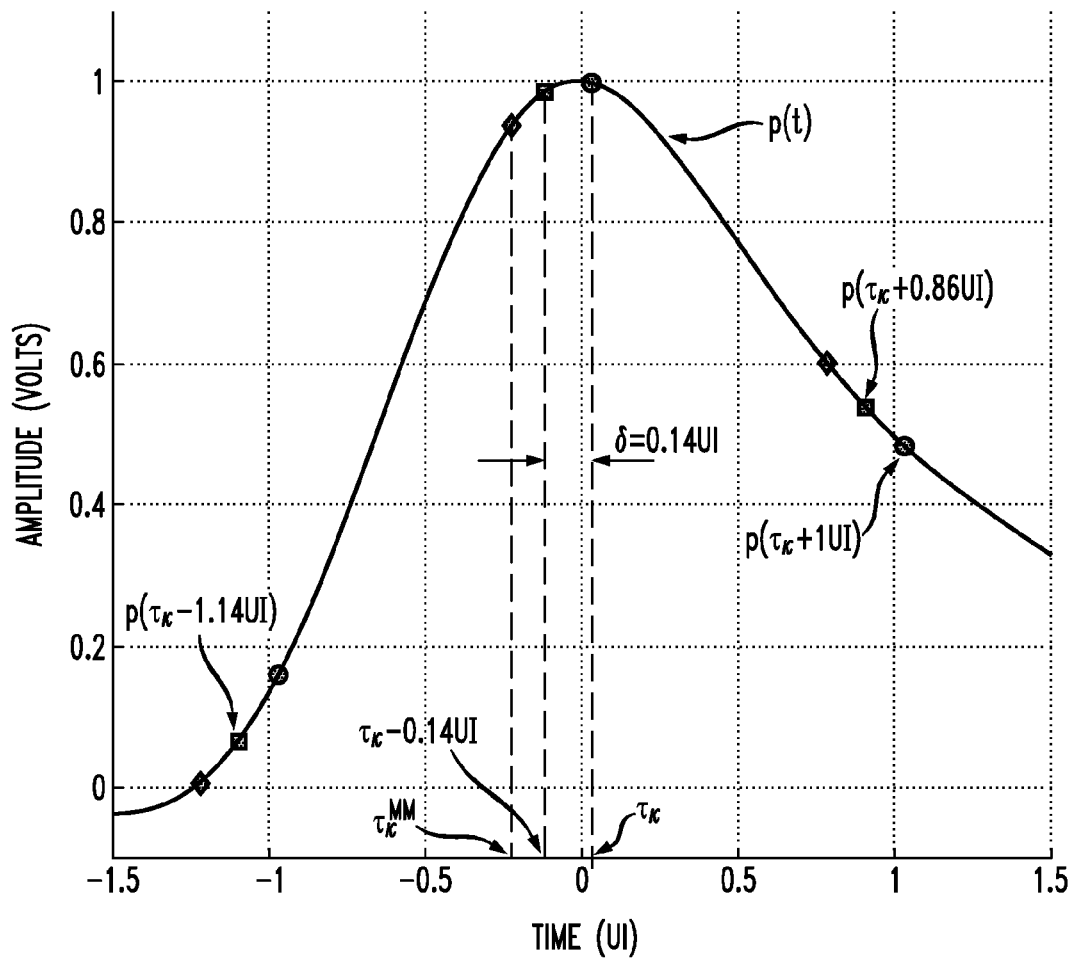
FIG. 8 shows a pulse response of an input symbol pulse as might be observed at a CDR when DFE is employed.

FIG. 8 shows pulse response, p(t), 800 as might be observed at a receiver when a DFE is employed. A Mueller-Muller baud-rate CDR in conjunction with a decision-feedback equalizer removes post-cursor inter-symbol interference (ISI) but not pre-cursor ISI. In the absence of a receive feed-forward equalizer (RX-FFE) or if the transmit FIR does not properly cancel the pre-cursor, the residual pre-cursor has a major impact on the settling point of the Mueller-Muller CDR. The CDR shifts the sampling phase to the left of the peak so that the 1st pre-cursor (with respect to the sampling point) is close to zero. Accordingly the magnitude of the 1st post-cursor (in the unequalized pulse response) increases because of shifting left. However the DFE can cancel this post-cursor ISI. The resulting equalized pulse has 1st pre-cursor& 1st post-cursor (superscript e denotes equalized). Hence, the equalized eye is asymmetric about the sampling point. Particularly, the left horizontal eye opening (Hl) is smaller than the right (Hr).

If a conventional MM-CDR is employed, the CDR settles at phase $\tau_k^{MM}$ (solid diamonds in FIG. 8) where the precursor is 0. With a Skew-CDR operating in accordance with an embodiment of the present invention with $\delta=-0.14$ UI, the data sampling phase is at $\tau_k$ (solid circles in FIG. 8) and the sampling phase of each timing error latch is $\tau_k-0.14$ UI (solid squares in FIG. 8). The error samples for the DFE adaptation are obtained at $\tau_k$. If the 1st DFE tap converges to $p(\tau_k+1\ UI)$, and if the 1st DFE tap cancels approximately the same amount of post-cursor for the entire 1 UI period, then the convergence of the CDR is such that the residual pre-cursor is equal to the residual post-cursor with respect with the sampling phase of the timing error latch, such as given in relation (2):

$$p(\tau_k-0.14\ UI+1\ UI)-p(\tau_k+1\ UI)=p(\tau_k-0.14\ UI-1\ UI) \quad (2a)$$

$$p(\tau_k+0.86\ UI)-p(\tau_k+1\ UI)=p(\tau_k-1.14\ UI) \quad (2b)$$

Figure 9:
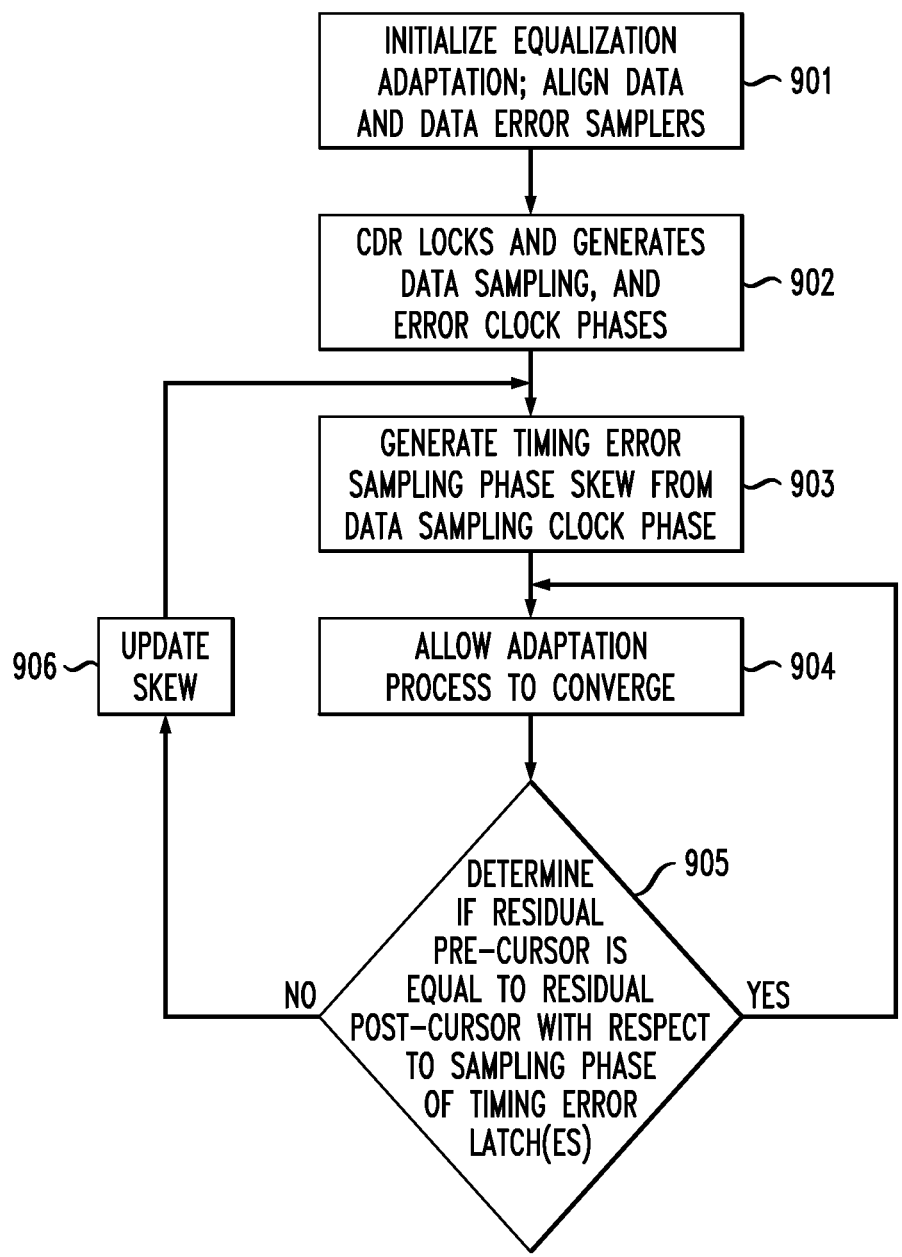
FIG. 9 shows an exemplary method as might be employed by embodiments of the present invention.

FIG. 9 shows an exemplary method as might be employed by embodiments of the present invention. At step 901, the receiver initializes equalizer adaptation, as well as the data, data error (if data error samplers are present) and timing error sampler clock phases. At step 902, the CDR locks to data symbol timing, sets the data sampling phase at $\tau_k$, and aligns the data error sampling clock phase(s) (if data error samplers are present) with the data sampling phase at $\tau_k$. At step 903, the CDR generates timing error Skew ($\delta$) and sets the timing error sampling clock phase at $\tau_k+\delta$ in relation to the data sampling phase at $\tau_k$. At step 904, the CDR allows the adaptation process(es) to converge. At step 905, the method monitors whether the residual pre-cursor is equal to the residual post-cursor with respect to the timing error sampling clock phase at $\tau_k+\delta$. If so, from step 905, the method loops back to step 904 to monitor and maintain adaptation convergence; otherwise, at step 906, the method updates the value of timing error Skew ($\delta$) and returns to step 903 to generate the timing error sampling clock with the updated value of timing error Skew ($\delta$).

Performance of embodiments of the present invention might be evaluated and compared with simulation. Simulation results are given for 3 cases to illustrate the capability of Skew-CDR. Positive skew implies the timing error latch sampling phase leads the data latch phase (i.e., in the corresponding data eye diagram the sampling phase for timing error latch is to the right of the data sampling phase); similarly, negative skew implies sampling phase for the timing error latch is to the left of the data sampling phase. The pulse responses and corresponding data eye diagrams with MM-CDR and Skew-CDR for the 3 cases are shown in FIGS. 10-18.

Figure 10:
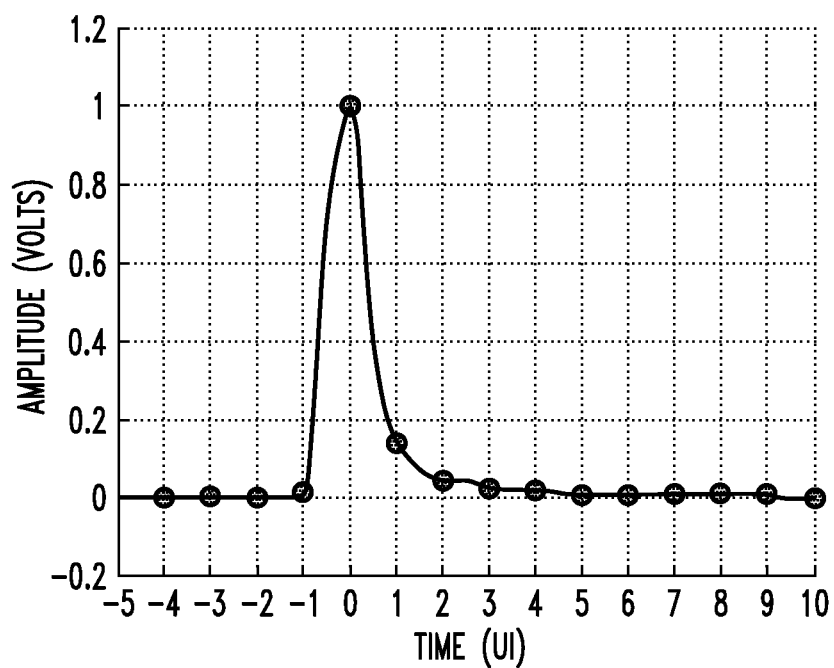
FIG. 10 shows a Case 1 pulse response with residual post-cursor as might be applied to a CDR.
Figure 11:
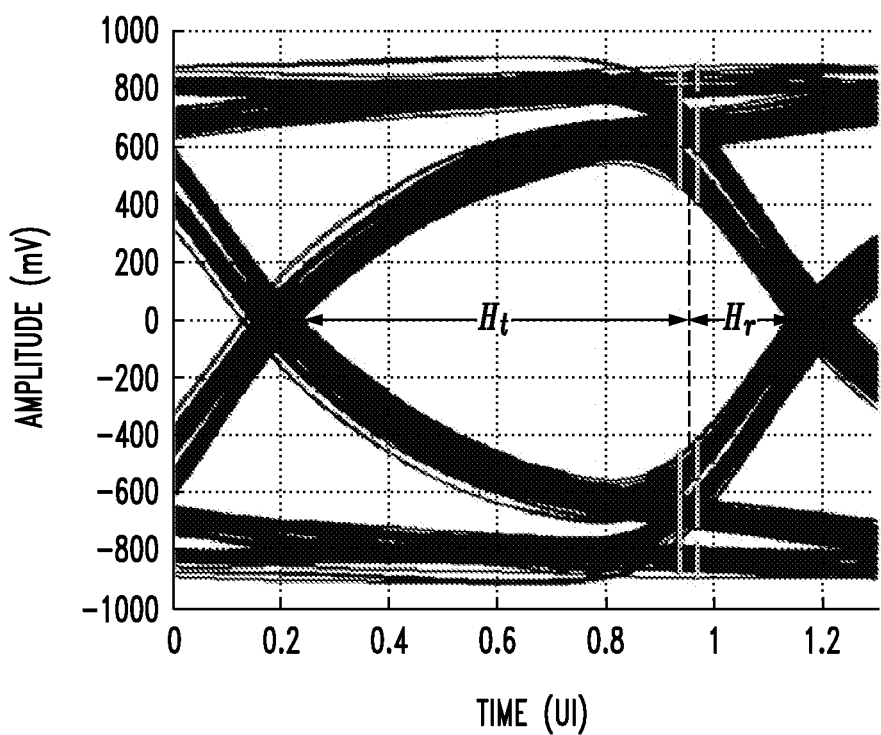
FIG. 11 shows an exemplary data eye diagram for a Case 1 receiver employing a MM-CDR.
Figure 12:
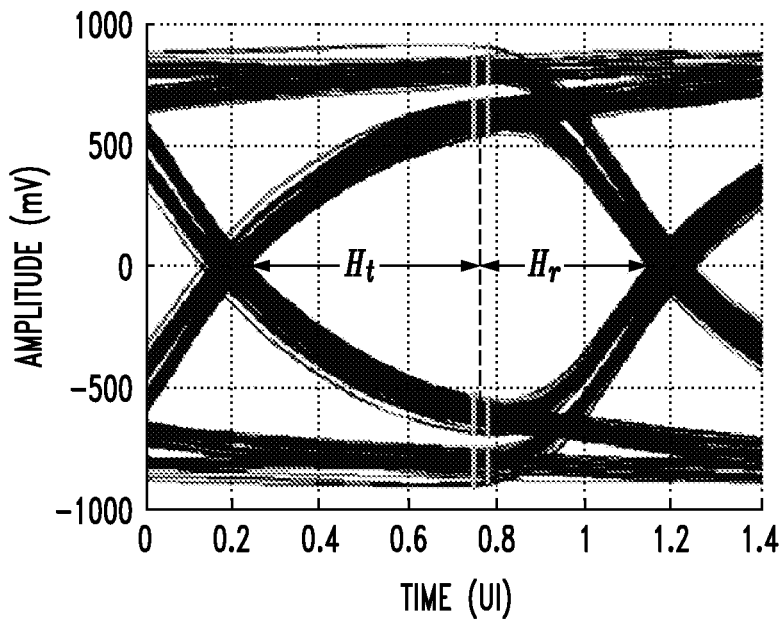
FIG. 12 shows an exemplary data eye diagram for a Case 1 receiver employing a Skew-CDR where Skew ($\delta$) is positive-valued.
Figure 14:
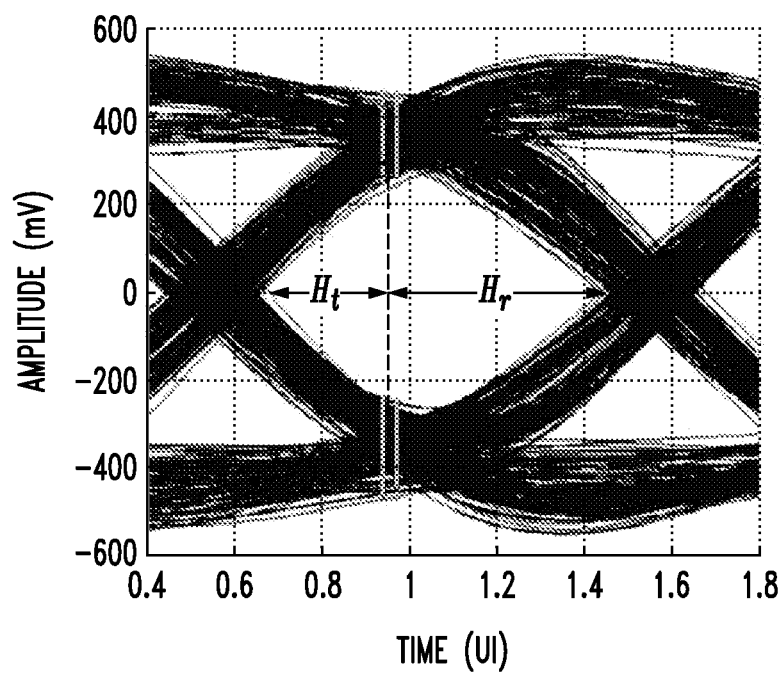
FIG. 14 shows an exemplary data eye diagram for a Case 2 receiver employing a MM-CDR.
Figure 15:
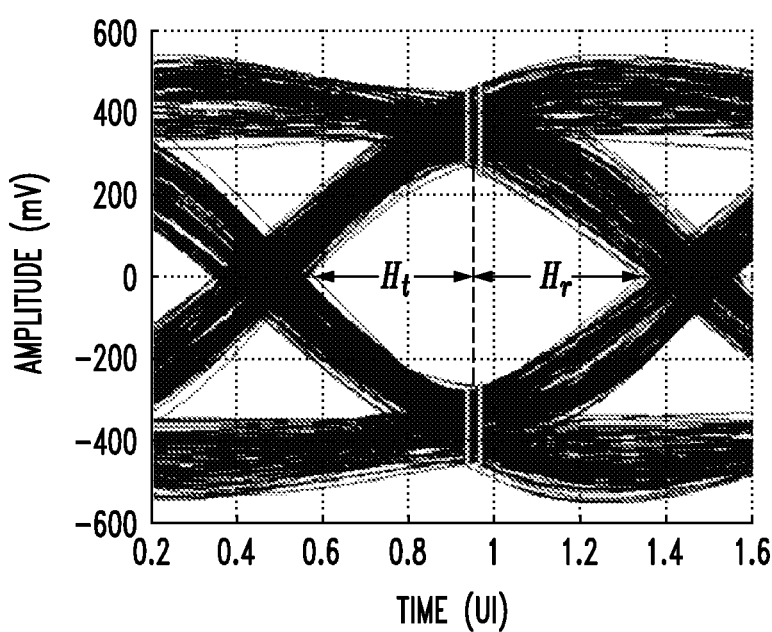
FIG. 15 shows an exemplary data eye diagram for a Case 2 receiver employing a Skew-CDR where Skew ($\delta$) is negative-valued.
Figure 17:
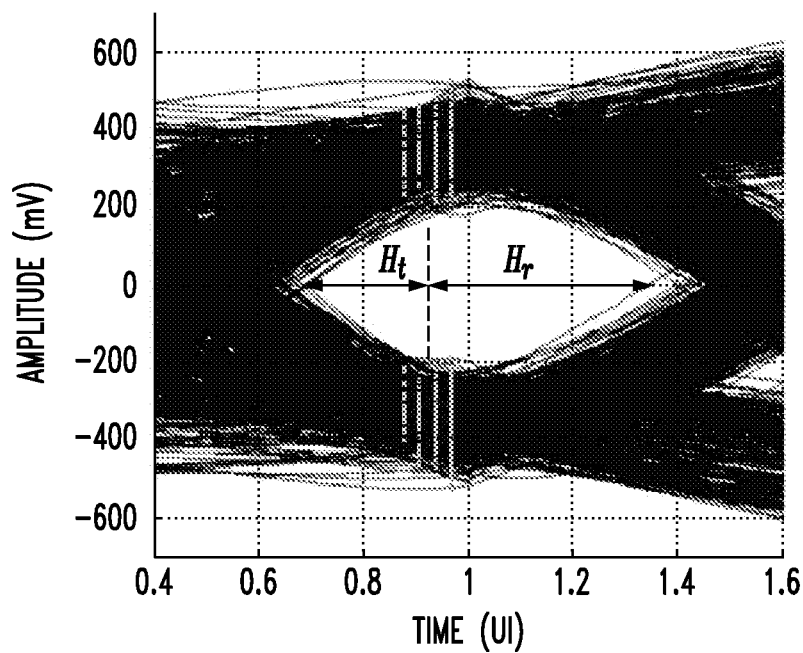
FIG. 17 shows an exemplary data eye diagram for a Case 3 receiver employing a MM-CDR.
Figure 18:
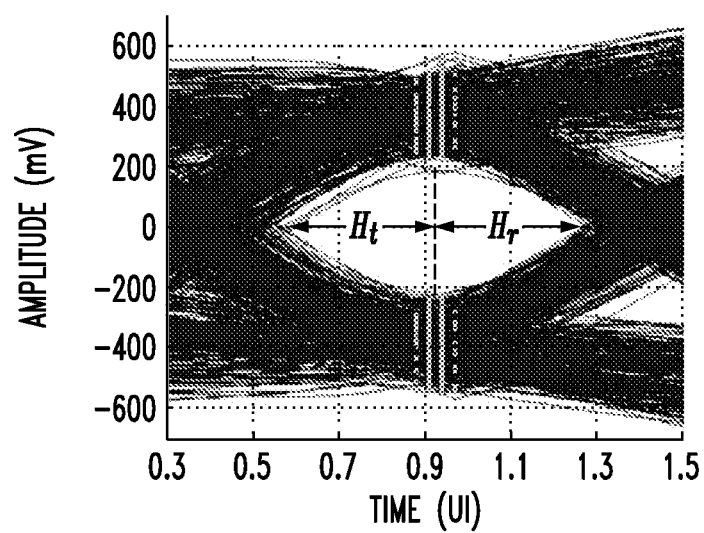
FIG. 18 shows an exemplary data eye diagram for a Case 3 receiver employing a Skew-CDR where Skew ($\delta$) is negative-valued.

Case 1 illustrates performance for a pulse response with residual post-cursor, as shown by the pulse response of FIG. 10. For Case 1, the receiver does not employ DFE. FIG. 11 shows an exemplary data eye diagram for a Case 1 receiver employing a MM-CDR, while FIG. 12 shows an exemplary data eye diagram for a Case 1 receiver employing a Skew-CDR where Skew ($\delta$) is positive-valued (i.e., $\delta>0$). Case 2 illustrates performance for a pulse response with residual pre-cursor, as shown by the pulse response of FIG. 13. For Case 2, the receiver does not employ DFE. FIG. 14 shows an exemplary data eye diagram for a Case 2 receiver employing a MM-CDR, while FIG. 15 shows an exemplary data eye diagram for a Case 2 receiver employing a Skew-CDR where Skew ($\delta$) is negative-valued (i.e., $\delta<0$). Case 3 illustrates performance for a pulse response with residual pre- and post-cursor, as shown by the pulse response of FIG. 16. For Case 3, the receiver employs DFE. FIG. 17 shows an exemplary data eye diagram for a Case 3 receiver employing a MM-CDR, while FIG. 18 shows an exemplary data eye diagram for a Case 3 receiver employing a Skew-CDR where Skew (δ) is negative-valued (i.e., δ<0).

Figure 13:
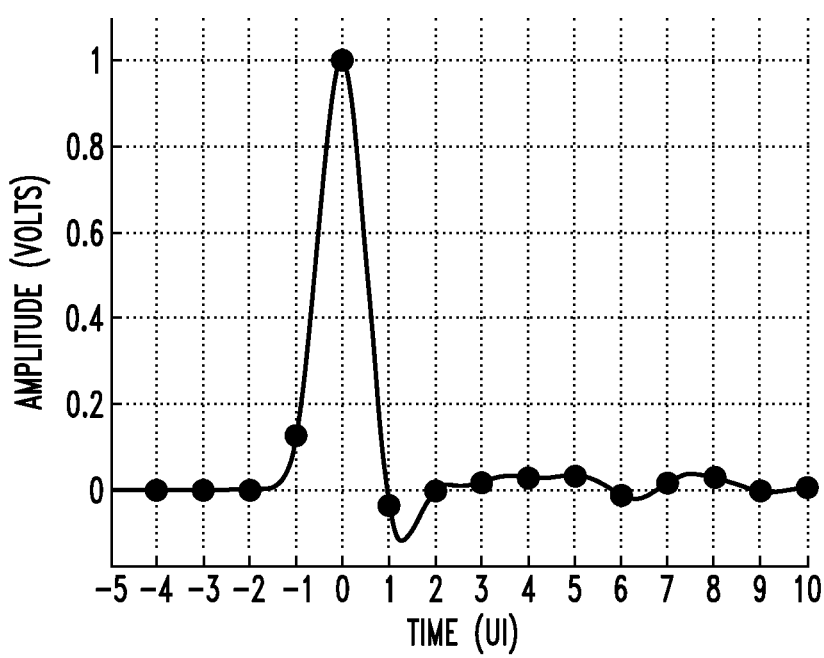
FIG. 13 shows a Case 2 pulse response with residual pre-cursor as might be applied to a CDR.
Figure 16:
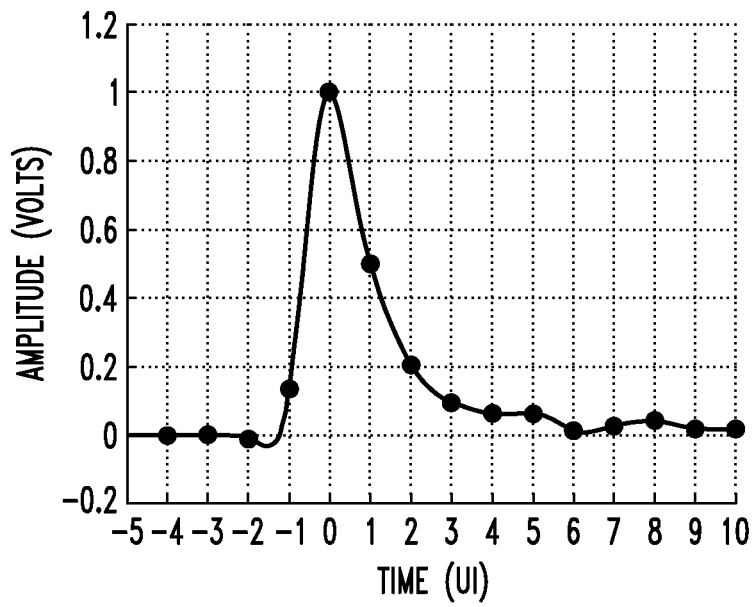
FIG. 16 shows a Case 3 pulse response with residual pre- and post-cursor as might be applied to a CDR of a receiver employing DFE.

In the FIGS. 10, 13, and 16, the solid circles overlaid on a pulse response correspond to the data sampling phase and are the baud-spaced (1 UI apart) amplitude of the normalized pulse response of the channel. The left (Hl) and right (Hr) horizontal eye openings and the corresponding horizontal eye margins (e.g., as calculated as 2*min(Hl, Hr)) are given in Table 1. As shown by a comparison of the simulation results of FIGS. 9-17, a Skew-CDR operating in accordance with exemplary embodiments of the present invention improves horizontal eye margin considerably compared to conventional MM-CDRs.

TABLE 1

|  | Mueller-Muller CDR | | | Skew CDR | | |
| --- | --- | --- | --- | --- | --- | --- |
|  | Hl (UI) | Hr (UI) | 2*min(Hl, Hr) (UIpp) | Hl (UI) | Hr (UI) | 2*min(Hl, Hr) (UIpp) |
| Case 1 | 0.7136 | 0.1868 | 0.3737 | 0.5173 | 0.3783 | 0.7566 |
| Case 2 | 0.2728 | 0.4899 | 0.5455 | 0.3681 | 0.3878 | 0.7362 |
| Case 3 | 0.2317 | 0.4222 | 0.4635 | 0.3437 | 0.3408 | 0.6817 |

While the exemplary embodiments herein show a two detectors placed within the eye, the present invention is not so limited. One skilled in the art might employ more samplers to increase accuracy. Each sampler might have a corresponding threshold control and comparator, and in addition to tracking the transitions, detecting the data, and monitoring timing and/or sampling error, one might employ the additional error samplers to determine, for example, rate of change in phase error or similar quantities.

A transceiver operating in accordance with one or more embodiments of the present invention might provide for the following advantages. The transceiver might exhibit increased horizontal data eye margin by adjusting the sampling phase in a baud rate CDR using timing skew. Consequently, such transceiver might exhibit increased speed and reliability in unfavorable communication environments.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Apparatus for baud-rate timing recovery in a receiver comprising:
   an eye sampler configured to sample a data eye from a data stream subject to equalization, the eye sampler including at least one data error sampler, at least one timing error sampler, and at least one data sampler;
   a skew clock and data recovery (CDR) circuit configured to:
   i) generate a data clock to each data sampler and to each data error sampler at a baud rate of the data stream, wherein the skew CDR positions, in amplitude and phase, the data clock so as to position the data sampler about the center of the data eye, and
   ii) generate a timing error clock from each timing error sampler, the timing error clock skewed by a phase offset from the data clock; and
   the CDR circuit configured to adaptively adjust phases of the data clock and the timing error clock based on samples from each data sampler and each timing error sampler based on a predetermined criterion.

2. The apparatus of claim 1, the CDR circuit further configured to:
   adaptively set parameters of an equalizer applied to the data stream based upon outputs of each data error sampler and each data sampler, wherein each data error sampler samples in phase with the data clock.

3. The apparatus of claim 2, wherein the equalizer is a decision feedback equalizer (DFE) of the receiver.

4. The apparatus of claim 2, wherein the CDR circuit is coupled to a transmitter configured to provide the data stream, wherein the transmitter, based on an indication of the CDR circuit, adaptively sets parameters of one or more devices of the transmitter in a signal path of the data stream, each device comprising at least one of a gain, a filter, and an equalizer.

5. The apparatus of claim 2, wherein the CDR circuit is further configured to adaptively set parameters of at least one of a filter and a gain applied to the data stream.

6. The apparatus of claim 1, wherein the CDR circuit is further configured to:
   adaptively set parameters of an equalizer applied to the data stream based upon samples by each data error sampler and each data sampler.

7. The apparatus of claim 1, wherein, at a convergence of the skew CDR circuit, a residual pre-cursor of the data stream is equivalent to a residual post-cursor of the data stream with respect with the sampling phase of each data error sampler.

8. The apparatus of claim 1, wherein the skew CDR circuit implements a baud-rate CDR update of the data clock in accordance with a predetermined minimized-error criterion.

9. The apparatus of claim 8, wherein the skew CDR circuit is a Mueller-Muller CDR.

10. The apparatus of claim 1, wherein the apparatus is embodied in a Serial DeSerializer (SerDes) device.

11. A method of generating timing in a receiver comprising:
    generating, by an eye sampler, a data eye from a data stream subject to equalization, the eye sampler including at least one data error sampler, at least one timing error sampler, and at least one data sampler;
    generating, with a skew clock and data recovery (CDR) circuit,
    i) a data clock to each data sampler and to each data error sampler at a baud rate of the data stream, wherein the skew CDR positions, in amplitude and phase, the data clock so as to position the data sampler about the center of the data eye, and
    ii) a timing error clock from each timing error sampler, the timing error clock skewed by a phase offset from the data clock; and
    adaptively adjusting phases of the data clock and the timing error clock based on samples from each data sampler and each timing error sampler based on a predetermined criterion.

12. The method of claim 11, further comprising:
    adaptively setting parameters of an equalizer applied to the data stream based upon outputs of each data error sampler and the data sampler, wherein each data error sampler samples in phase with the data clock.

13. The method of claim 12, wherein the equalizer is a decision feedback equalizer (DFE) of the receiver.

14. The method of claim 12, comprising:
    providing, by a transmitter, the data stream, and
    adaptively setting parameters of one or more devices of the transmitter in a signal path of the data stream based upon outputs of one or more of the at least one data error sampler, the at least one timing error sampler, and the at least one data sampler of the receiver.

15. The method of claim 12, further comprising:
    adaptively setting parameters of at least one of a filter and a gain applied to the data stream.

16. The method of claim 11, further comprising:
    adaptively setting parameters of an equalizer applied to the data stream based upon samples generated by one or more of the at least one data error sampler and the at least one data sampler.

17. The method of claim 11, comprising converging operation of the skew CDR circuit, wherein, at a convergence, a residual pre-cursor of the data stream is equivalent to a residual post-cursor of the data stream with respect to the sampling phase of the data error sampler.

18. The method of claim 11, comprising updating, by the skew CDR circuit, with a baud-rate CDR update of the data clock in accordance with a predetermined minimized-error criterion.

19. The method of claim 18, wherein the skew CDR circuit updates in accordance with a Mueller-Muller algorithm.

20. A non-transitory machine-readable storage medium, having encoded thereon program code, wherein, when the program code is executed by a machine, the machine implements a method for generating timing in a receiver, comprising the steps of:

generating, by an eye sampler, a data eye from a data stream subject to equalization, the eye sampler including at least one data error sampler, at least one timing error sampler, and at least one data sampler;

generating, with a skew clock and data recovery (CDR) circuit,
  i) a data clock to each data sampler and to each data error sampler at a baud rate of the data stream, wherein the skew CDR positions, in amplitude and phase, the data clock so as to position the data sampler about the center of the data eye, and
  ii) a timing error clock from each timing error sampler, the timing error clock skewed by a phase offset from the data clock; and adaptively adjusting phases of the data clock and the timing error clock based on samples from each data sampler and each timing error sampler based on a predetermined criterion.

* * * * *